G. W. GILBERT.
Churn.
No. 34,110.
Patented Jan. 7, 1862.
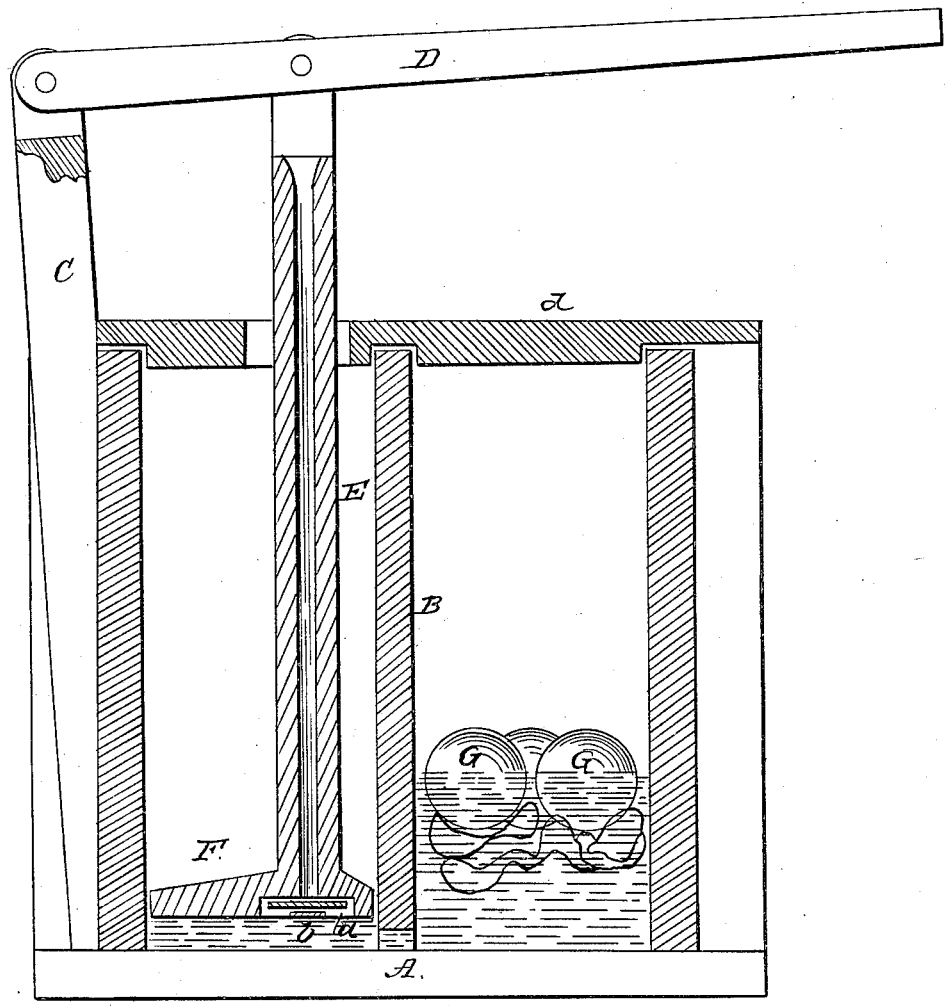

UNITED STATES PATENT OFFICE.

GEORGE W. GILBERT, OF BETTSVILLE, OHIO.

IMPROVEMENT IN CHURNS.

Specification forming part of Letters Patent No. 34,110, dated January 7, 1862.

*To all whom it may concern:*

Be it known that I, GEORGE W. GILBERT, of Bettsville, in the county of Seneca and State of Ohio, have invented a new and useful Improvement in Churns; and I do hereby declare that the following is a full, clear, and exact description of the same, reference being had to the accompanying drawing, making a part of this specification, and being a vertical longitudinal section of my improved churn.

The nature of this invention consists in the manner of arranging within separate compartments of a churn, communicating with each other, in one a hollow staff having an up-and-down motion and in the other loose balls, the whole operating in conjunction in the manner and for the purpose hereinafter fully explained.

To enable others skilled in the art to make and use my invention, I will proceed to describe its construction and operation.

A represents the churn-box, constructed in the usual manner, divided into two compartments by a partition B, which is fitted in grooves formed on the inner side of the sides of the churn-box, so that it can be removed for cleaning the churn or for any other purpose by simply drawing it out from the top. The bottom of the said partition is cut away in the center, so as to form a communication between the two compartments.

$d$ is a cover, and C is a standard secured to one end of the box.

D is a hand-lever fulcrumed at one end in the top of the standard C and connected to the hollow staff, and by means of which the staff receives an up-and-down motion.

E is the staff, having a hole formed through its entire length for the purpose of admitting air into the churn below the follower and forcing it through the cream in the act of churning.

F is a follower attached near one side to the bottom of the staff and provided with a check-valve $a$, which opens and closes the communication between the churn and external air. The said valve is fitted loosely within a recess formed in the under side of the follower and kept in position by a strap or cross-bar $b$.

G G represent loose balls, composed of wood or other material. The cream to be converted into butter is first put into either of the compartments, when it immediately seeks the same level in the opposite compartment through the opening under the partition.

The operation of churning is performed by working the handle up and down, which causes the follower to rise and fall in its compartment. As the follower descends, the cream is forced through the opening beneath the partition into the compartment containing the loose balls, and the friction excited thereby made to materially assist in breaking the globules of the cream and converting the same into butter. The loose balls floating and moving about on top of the cream act to gather the butter as it rises to the surface.

A churn constructed as above described is simple and effective, and can be made at a cost to bring it within the reach of every household.

Having thus described my invention, what I claim as new, and desire to secure by Letters Patent, is—

The arrangement of the hollow staff E, follower F, valve $a$, and lever D, in combination with the partition B and loose balls G G, all constructed, combined, and operating in the manner and for the purpose hereinbefore explained.

G. W. GILBERT.

Witnesses:
   A. ASH,
   GEORGE K. FEASEL.